US006053475A

United States Patent [19]

Batschied et al.

[11] Patent Number: 6,053,475

[45] Date of Patent: Apr. 25, 2000

[54] TAP FOR WITHDRAWING FLUID FROM A CONTAINER

[75] Inventors: Karl Batschied; Kurt Oberhofer, both of Wilhelmsfeld; Walter Fegert, Heilbronn; Hermann Kögel, Öhringen, all of Germany

[73] Assignee: Huber Verpackungen GmbH & Co., Germany

[21] Appl. No.: 09/121,823

[22] Filed: Jul. 24, 1998

[30] Foreign Application Priority Data

| | | | |
|---|---|---|---|
| Dec. 13, 1997 | [DE] | Germany | 297 22 034 U |
| Dec. 13, 1997 | [DE] | Germany | 297 22 035 U |
| Jun. 10, 1998 | [DE] | Germany | 198 25 929 |

[51] Int. Cl.[7] .......... F16K 3/26; B67D 3/04

[52] U.S. Cl. .......... 251/351; 222/522

[58] Field of Search .......... 251/349, 351; 222/522, 523, 538

[56] References Cited

U.S. PATENT DOCUMENTS

| | | | |
|---|---|---|---|
| 1,579,567 | 4/1926 | Schriner | 251/351 |
| 1,629,303 | 5/1927 | Phillips | 251/351 X |
| 1,912,304 | 5/1933 | Phillips | 222/523 X |
| 1,924,057 | 8/1933 | Draper et al. | 222/522 X |
| 2,851,202 | 9/1958 | Bradbury | 222/522 X |
| 2,925,989 | 2/1960 | Hempel | 251/351 X |
| 3,173,579 | 3/1965 | Curie | 222/522 X |
| 4,022,357 | 5/1977 | Dwinell | 222/538 X |
| 4,478,242 | 10/1984 | Bond | 222/522 X |
| 4,802,610 | 2/1989 | Cheek et al. | 222/522 X |
| 4,997,108 | 3/1991 | Hata | 251/351 X |
| 5,162,018 | 11/1992 | Horton | 251/351 X |
| 5,379,922 | 1/1995 | Paradoski | 222/522 X |

FOREIGN PATENT DOCUMENTS

| | | |
|---|---|---|
| 1007649 | 5/1957 | Germany . |
| 1954125 | 4/1976 | Germany . |
| 2824874 | 12/1979 | Germany . |
| 3518000 | 11/1986 | Germany . |
| 19540542 | 5/1997 | Germany . |
| WO97/16350 | 5/1997 | Germany . |
| 0635021 | 3/1950 | United Kingdom . |

*Primary Examiner*—John Rivell
*Attorney, Agent, or Firm*—William A. Drucker

[57] ABSTRACT

A tap is provided for withdrawing fluid from a container comprising an outer tube, which can be fitted in an opening of the container in sealing engagement and in which an inner tube is received in sliding and sealing engagement, an inlet opening arranged in the outer tube, and an inlet opening arranged in the inner tube which communicates with an outlet opening in the inner tube that can be transferred by a corresponding movement of the inner tube from a closed position, in which the inner tube is completely inserted in the outer tube and in which the inlet openings of the outer tube and the inner tube do not overlap, to an open position in which the inlet openings of the outer tube and the inner tube are at least partially aligned one with the other. The outer tube and the inner tube comprise a guide having an axial portion that permits the inner tube to be pulled out of the outer tube to a ready position in which the inlet openings of the outer tube and the inner tube are not yet aligned one with the other, and a circumferential portion which permits the inner tube to be rotated from its ready position to its open position.

31 Claims, 3 Drawing Sheets

16
32
20
36
37
46
22
47
42
44
40
38
30
28
26
VIII
IX
X
XI

TAP FOR WITHDRAWING FLUID FROM A CONTAINER

BACKGROUND OF THE INVENTION

The present invention relates to a tap for withdrawing fluid from a container comprising an outer tube, which can be fitted in an opening of the container in sealing engagement and in which an inner tube is received in sliding and sealing engagement, an inlet opening arranged in the outer tube and an inlet opening arranged in the inner tube which communicates with an outlet opening in the inner tube that can be transferred by a corresponding movement of the inner tube from a closed position, in which the inner tube is completely inserted in the outer tube and in which the inlet openings of the outer tube and the inner tube do not overlap, to an open position in which the inlet openings of the outer tube and the inner tube are at least partially aligned one with the other, there being provided between the outer tube and the inner tube guide means comprising an axial portion that permit the inner tube to be pulled out of the outer tube to a ready position in which the inlet openings of the outer tube and the inner tube are not yet aligned one with the other.

The present invention further relates to a container equipped with such a tap.

A tap, and a container equipped with such a tap, of the before-mentioned type are known from WO 97/16350.

The known container preferably is a party keg having a capacity of 5 liters or 10 liters from which beer is to be tapped via an integrated tap. To this end, an outer tube is received in an opening provided at the lower end of the party keg by means of a plug-like sealing element. An inner tube is guided in the outer tube to slide in axial direction. Both the outer tube and the inner tube are provided with an inlet opening, and the inlet opening of the inner tube communicates, via the inner space of the inner tube, with an outlet opening provided on the outer lower end of the outer tube. The inner tube can be pulled out from a closed position, in which the inner tube is fully inserted in the outer tube and in which the inlet openings do not overlap each other by any degree, to an open position in which the inlet openings of the inner tube and the outer tube come to overlap and beer from the interior of the party keg starts to enter initially the hollow space in the inner tube and then to leave the keg through the outlet opening.

In addition, this publication further discloses a tap which is opened by rotating the inner tube relative to the outer tube in order to trigger the tapping process. To this end, there is provided a guiding groove which extends spirally about the inner tube and which is engaged by a guide pin firmly connected to the outer tube in the area of the wall of the fluid container. Thus, when the inner tube is rotated in the suitable sense, the inner tube moves axially in outward direction until finally, in an end position, the inlet openings of the inner tube and the outer tube come to overlap each other so as to permit fluid to leave the container.

However, such an arrangement is very cumbersome from a handling point of view and leads in addition to considerable problems in terms of sealing.

It generally has to be considered in connection with such taps, if they are to be suited for tapping fluid from containers in which an overpressure prevails, such as a party keg, that considerable problems arise in connection with the safe sealing under all operating conditions, because it has to be taken into account that an inner pressure of approximately 1 to 1.5 bars prevails for example inside a beer keg, even in cooled and undisturbed condition, and that higher pressures of some bars may be reached for beer which is not sufficiently cooled or that has been shaken inadvertently.

Although it is generally possible to achieve proper sealing by different, sufficiently sized sealing surfaces, the contact pressures required between the different sealing surfaces generally have the result that moving the tap will in part be possible only by application of considerable forces in order to overcome the friction caused by the high contact pressure.

SUMMARY OF THE INVENTION

It is a first object of the present invention to provide an improved tap and an improved container equipped with such a tap, which render the tapping process as simple as possible. It is a further object of the invention to provide a tap which ensures a proper sealing, even under high internal pressures but allows an opening and closing without the application of high forces. It is still another object of the invention to provide a tap which is suitable for integration into a container such as a beer keg which can be almost fully received within the container before it is used the first time. It is another object of the invention to provide a container with an integrated tap that can be easily transported and ensures proper sealing.

According to the invention, these and other objects are achieved with a tap of the before-mentioned type by the fact that the axial portion of the guide is followed by a circumferential portion which permits the inner tube to be rotated from its ready position to its open position.

The object of the invention is thus perfectly achieved.

That is, by combining an axial movement of the inner tube inside the outer tube with a subsequent rotary motion of the inner tube in the outer tube, the initiation of the tapping process, which is effected in a simple way by pulling the inner tube out of the outer tube until it reaches a ready position in which fluid is not yet permitted to issue from the container and in which the container can be held, if necessary, by one hand, is completely uncoupled from the tapping process as such, which should be effected as sensitively as possible.

The tapping process as such is effected by a rotary motion, after the ready position has been reached, which may in addition be conveniently indicated by a stop. The user, wishing for example to broach the party keg, may now turn the inner tube with caution in the outer tube until the fluid starts to flow out, and may thus let off any overpressure and froth, before he opens the tap further in order to tap beer in the desired manner and relatively quickly.

By combining an initial axial motion, which introduces the tapping process but during which the fluid is not yet permitted to flow from the interior of the container, with a subsequent rotary motion triggering the tapping process as such, it is ensured that the tapping process will not inadvertently be initiated too quickly, a circumstance which cannot be completely excluded for an unexperienced user in the case of the above-described known tap. The tap according to the invention therefore also achieves a considerably improved degree of safety from faulty operation. In addition, the problem regarding the displacement of the container on its support in the empty or partially empty condition is also avoided as tilting a keg-like container with a sufficiently large bottom surface on its support is practically not possible.

The tap itself is received within the container almost fully retracted in an opening thereof, before it is used for the first time.

According to an advantageous development of the invention, means for anti-rotational mounting in the opening of the container are provided on the outer tube.

Although in many cases, when the outer tube is received in the opening of a container firmly and in sealing engagement, any rotation would anyway be excluded due to the high frictional forces, this feature safely avoids any rotation within the opening of the container, which would of course have the result to impair the function of the tap, even if the outer tube should be held in the opening of the container with insufficient strength.

Such anti-rotational mounting can be achieved in many different ways, although it is preferred to arrange form-fit elements between the outer tube and the opening. For example ribs, projections or other elements may be arranged on the outer tube to engage suitable mating recesses in the opening of the container, or vice versa. Further, the outer tube and/or a sealing element attached thereto may have an outer contour differing from a circular shape, whereby again a form-fit locking effect can be achieved.

According to another feature of the invention, an axial stop, indicative of the fact that the ready position has been reached, is arranged at the end of the axial portion. This feature has the effect to simplify handling by the fact that the user can pull out the inner tube from the outer tube right to the stop which indicates that the tap now occupies its ready position and that the tapping process can be initiated by a subsequent rotary motion.

According to a further preferred development of the invention, at least one angular stop is provided for limiting the rotary motion of the inner tube.

This feature again simplifies handling due to the fact that the beginning and/or the end of the tapping process is clearly indicated to the user.

According to another feature of the invention, a plug sealing element configured according to the 2-component technology is provided on the outer tube for being received in the opening of the container.

This feature guarantees reliable sealing, that can be produced in an advantageous manner between the outer tube and the container wall. The 2-component technology, which is known as such, means that a plastic material constituting a hard core is coated with a softer plastic material whereby on the one hand an intimate, undetachable connection is achieved between the two plastic materials, while on the other hand a dimensionally stable, but sufficiently soft and elastic sealing can be obtained.

According to a still further feature of the invention, a sealing surface, designed according to the 2-component technology, is embedded in the lateral surface of the inner tube and arranged to cover the entire operating range of the inner tube, from the closed position through the ready position to the open position with fully overlapping inlet openings of the outer tube and the inner tube.

This feature improves the sealing effect between the inner tube and the outer tube.

According to an additional further development of that configuration, a sealing rib is arranged on the inner surface of the outer tube, comprising a first endless rib portion that surrounds the inlet opening of the outer tube, and a second endless rib portion that extends from the inlet opening of the outer tube over the full angular range on the inner surface of the outer tube defined by the potential angular rotation of the inner tube between the beginning of the open position and the moment when the inner tube abuts against the angular stop at the end of the open position.

This feature ensures that the seal can be moved with relatively little force so that the tap can be displaced and rotated with relative ease. This is guaranteed by the sealing rib because the latter leads to much higher surface pressures exclusively in the area of the thin rib, which on the one hand leads to an efficient sealing effect, capable of resisting even high pressures in the order of up to approximately 5 to 6 bars, while on the other hand clearly reduced frictional forces are obtained due to the smaller contact surface between the raised sealing rib made from a hard material that digs into the softer sealing surface. In this connection, a configuration of the sealing rib, comprising a first endless rib portion, surrounding only the inlet opening of the outer tube, and a second endless rib portion, covering the potential operating range during rotation of the inner tube, is preferred because at the beginning of the opening motion fluid is permitted to penetrate behind the seal constituted by the first endless rib portion, due to the inner opening of the inner tube communicating with the inlet opening of the outer tube, at least in part, so that the sealing effect of the first endless rib portion does no longer exist.

According to a further development of the invention, the inlet openings of the outer tube and the inner tube are circular in shape, or one of those two openings is circular in shape, whereas another one exhibits the shape of a drop, a keyhole, a triangular shape or the form of a slot extending in the circumferential direction, or comprises at least a transverse slot.

By providing such a shape, that differs from the circular form and widens gradually in the direction of the opening motion, it is possible, for example when tapping beer, to start the motion with caution by initially letting off any overpressure and froth, and to gradually increase the tapping speed thereafter. It is thus possible to carry out the tapping process with clearly greater sensitivity. The shape of a slot extending in the circumferential direction or in transverse direction may also be of advantage if it is desired to produce more froth with a low-froth beer.

According to a further embodiment of the invention, the guide comprises a locking hook arranged on the outer tube, intended to engage a guiding groove in the inner tube, the guiding groove on the inner tube extending over the axial portion and the circumferential portion, with the circumferential portion extending from the inner end of the axial portion opposite the outlet portion, that forms the axial stop and the first angular stop for the ready position, in circumferential direction at a right angle relative to the axial portion and forming at its end a second angular stop that limits the open position.

One thereby obtains a reliable guide for the combined displacement and rotary motion of the inner tube in the outer tube. The locking hook, being preferably mounted on a tongue in a cut-out portion of the outer tube, which latter is coated on its outside with a soft material according to the 2-component technology, may exhibit a certain resilience so that during assembly it can be introduced into the axial portion of the guiding groove and locked in the latter from the outside.

According to another embodiment of the invention, an actuating plate, comprising a fold-out handle, which is connected with the actuating plate by tear-off connecting strips, is integrally molded on the outer end of the inner tube.

The fold-out handle provides for ease of handling during both the sliding movement and rotation of the inner tube. The angular position of the handle may simultaneously serve to indicate the closing state (open or closed). The additional use of a breaking seal, as in the prior art described by DE 297 22 035 U1, is no longer necessary because the tear-off connecting strips provide sufficient proof of the original condition and because, in addition, when the handle is folded out, a certain discoloration occurs in the plastic material at the connection point between the handle and the actuating plate which likewise serves as an indication whether or not the handle had been actuated before.

According to a still further embodiment of the invention, the guides and the outlet openings are arranged in such a way that a rotary motion to the left is required for moving the system into its open condition.

This feature facilitates the use for an unexperienced user because an opening movement to the left corresponds to the usual rotation to the left required for opening a water tap.

It is understood that the features mentioned above and those yet to be explained below can be used not only in the respective combinations indicated, but also in other combinations or in isolation, without leaving the context of the present invention.

SHORT DESCRIPTION OF THE DRAWINGS

Further features and advantages of the invention will become apparent from the following description of a preferred embodiment, given with reference to the drawing in which.

DETAILED DESCRIPTION OF THE PREFERRED EMBODIMENT

Figures 1, 2, 3, 4, 5:
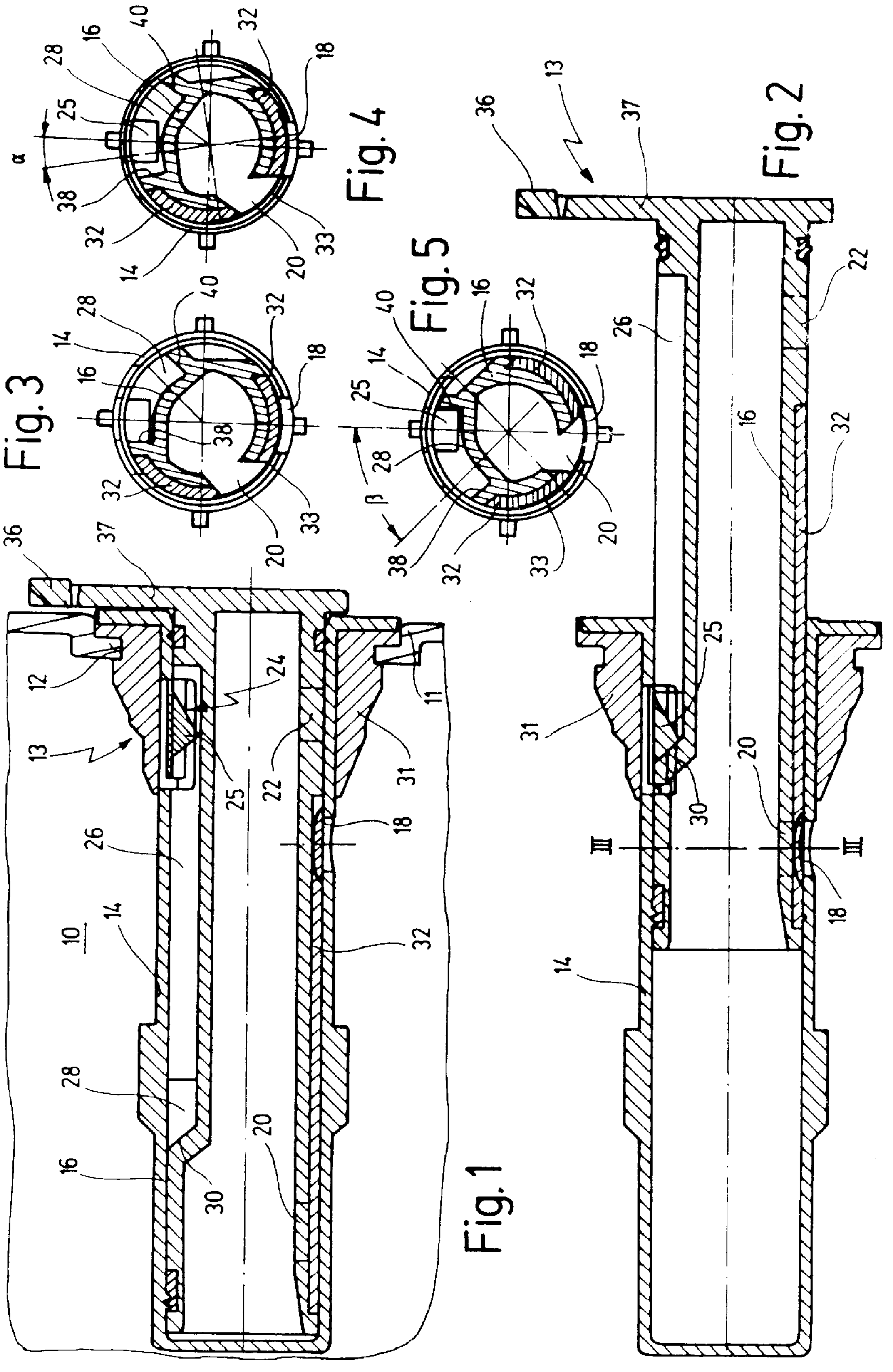
FIG. 1 shows a lengthwise section through a detail of a container according to the invention, with a tap according to the invention inserted in an opening of the container, in its fully inserted stated in the closed condition.
FIG. 2 shows the tap according to FIG. 1 in pulled-out condition in the ready position.
FIG. 3 shows a sectional view, taken along line III—III in FIG. 2, of the tap in its ready position in which the inner tube has not yet been rotated inside the outer tube.
FIG. 4 shows a sectional view, according to FIG. 3, where the inner tube has been rotated to the left by an amount $\alpha$, to the beginning of the open position so that fluid starts to leave the interior of the container in that position.
FIG. 5 shows a sectional view according to FIG. 3, where the inner tube has been rotated to the left by an amount $\beta$ against an angular stop, which indicates the end of the open position, where the greatest cross-section is available for the fluid to pass.

In FIG. 1, a detail of a container according to the invention, indicated generally by reference numeral 10, can be seen. Preferably, the container 10 is a party keg to be filled with beer. The container 10 comprises a wall 11, with an opening 12 provided therein directly above the bottom of the container, for receiving a tap indicated generally by reference numeral 13. The tap 13 comprises an outer tube 14, exhibiting a substantially cylindrical shape with its wall completely closed toward the inside of the container, with a soft plug sealing element 31 molded to its outer end according to the 2-component technology, by means of which the tap 13 is fitted in the opening 12 of the wall 11 of the container 10 in sealing engagement.

The tap 13 further comprises an inner tube 16 which is guided in the outer tube 14 to slide in axial direction and which in the pulled-out condition illustrated in FIG. 2 can be rotated to the left by a certain angular amount in order to permit beer to be tapped from the inside of the container. The inner tube 16 is closed off from the outside by an actuating plate 37 formed integrally with the inner tube 16 and closing the end face of the inner tube 16 off from the outside. As will be described further below with reference to FIG. 15, a fold-out handle 36 is molded integrally with the actuating plate 37, which serves as handle for the pulling-out and rotary motion of the inner tube 16.

Immediately behind the plug sealing element 31 a circular inlet opening is provided in the outer tube 14, at the bottom surface of the latter. The inner tube 16 is provided, in the vicinity of its inner end, with an inlet opening 20 which, instead of being located precisely at the bottom surface of the inner tube 16, is displaced in the lateral surface by an angular amount to the top and to the left so that the inlet opening 20 is indicated in FIG. 1 only by dashed lines, being positioned outside the sectional plane of FIG. 1.

Further, an outlet opening 22 is provided in the inner tube 16, in the vicinity of its outer end, which is likewise not located directly at the bottom surface of the inner tube, but is displaced in the lateral surface of the inner tube 16 by a certain angular amount to the top and to the left. Accordingly, the outlet opening 22 is likewise indicated only by dashed lines, being also located outside the sectional plane of FIG. 1.

Between the outer tube 14 and the inner tube 16, there is provided a guide indicated generally by reference numeral 24, comprising an axial portion 26, for the guided lateral axial displacement of the inner tube 16 relative to the outer tube 14, and a circumferential portion 28 which, in the position in which it is pulled out over the full axial portion 26 up to an axial stop 30, i.e. to a so-called ready position, permits the inner tube 16 to be rotated to the left by an angle $\beta$ until the rotary motion is limited by an angular stop.

Figures 6, 7, 8, 9, 10, 11:
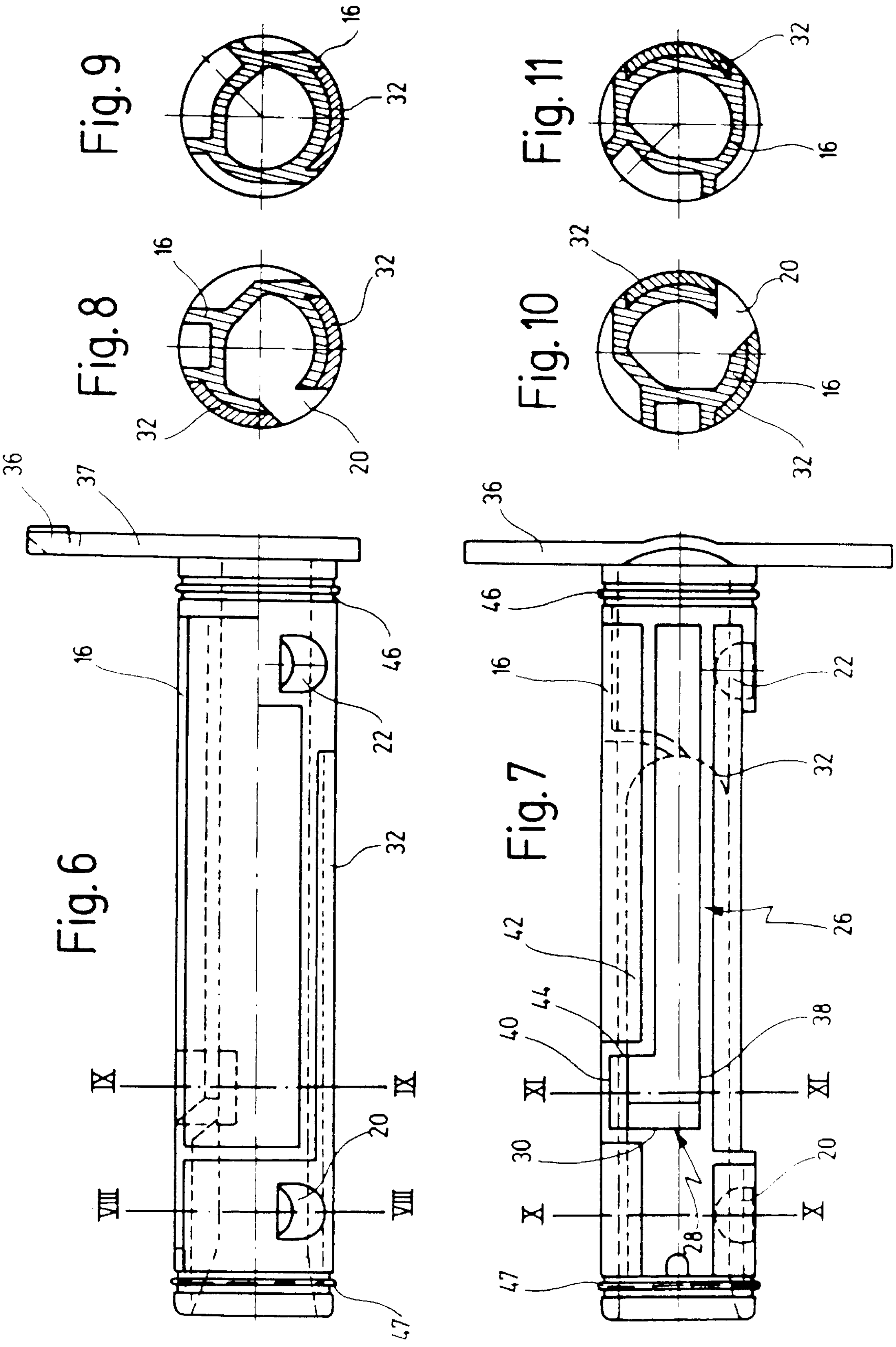
FIG. 6 shows a lengthwise section through the inner tube, viewed from the side.
FIG. 7 shows a top view of the inner tube in a position turned by 90°, relative to the view of FIG. 6.
FIG. 8 shows a section through the inner tube, taken along line VIII—VIII in FIG. 6.
FIG. 9 shows a section through the inner tube, taken along line IX—IX in FIG. 6.
FIG. 10 shows a section through the inner tube, taken along line X—X in FIG. 7.
FIG. 11 shows a section through the inner tube, taken along line XI—XI in FIG. 7.
Figure 13:
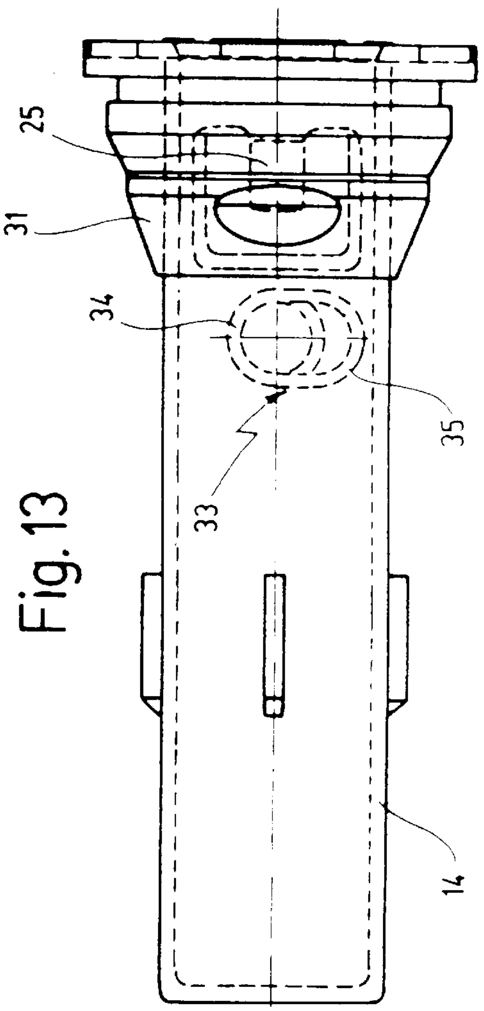
FIG. 13 shows a view of the inner tube from above, in a position rotated by 90° relative to the view of FIG. 12.

As can be seen in detail in FIG. 7, the guide 24 comprises an axial guiding groove 42 formed on the lateral surface of the inner tube 16 and followed at its inner end by a guiding groove 44 extending to the right in the circumferential direction. In the view of FIG. 7, the entire guiding groove of the axial portion 26 and of the circumferential portion 28 exhibits the basic shape of an L. Guided in the guiding groove 42 and/or 44 is a locking hook 25, which is formed integrally with the outer tube 14 and which, as can be seen more clearly in FIG. 13, is configured as a plate exhibiting a certain resilience and arranged in a recess of the outer tube 14, the looking hook 25 being enclosed by the softer sealing material of the plug sealing element 31 applied according to the 2-component technology.

During initial assembly, the inner tube 16 can thus be pushed into the outer tube 14, during which action the locking hook 25 will yield toward the outside until the locking hook 25 comes to engage the guiding groove 42 and/or 44.

The left rib of the axial guiding groove 42, viewed from the outside of the inner tube 16, forms a first angular stop limiting the rotary motion of the inner tube 16 to the right, relative to the outer tube 14. The rib opposite the first angular stop 38 of the guiding groove 44, viewed in the circumferential direction, forms a second angular stop 40 limiting the rotary motion of the inner tube 16 to the left, relative to the outer tube 14, to an amount β.

In order to guarantee complete and safe sealing of the tap 13 in the container under all operating conditions and even under interior pressures of up to approximately 6 bars, and to permit at the same time that tapping can be effected with relatively little force, a plurality of measures are provided:

Embedded in the lateral surface of the inner tube 16 is a soft sealing surface 32, produced according to the 2-component technology, that covers or embraces the entire operating range of the inner tube 16, from the closed position via the ready position to the limitation of the open position by the second angular stop 40, and even a little laterally beyond the latter. Corresponding to the potential movement of the inner tube 16 in the outer tube 14, the sealing surface 32 therefore has a substantially L-shaped basic form, viewed from the top.

Figure 12:
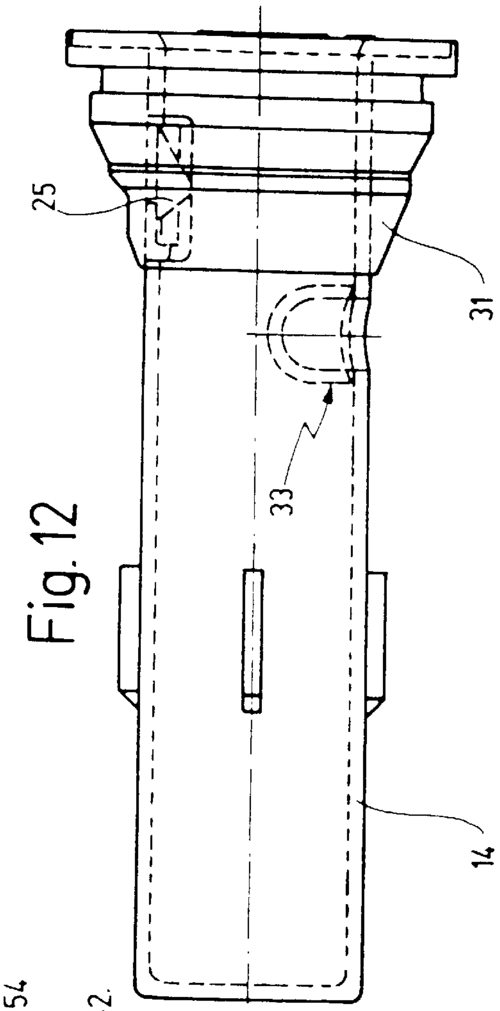
FIG. 12 shows a lengthwise view of the outer tube, viewed from the side.

In addition to the sealing surface 32, a sealing rib, indicated generally by reference numeral 33, is provided on the inner surface of the outer tube, the shape of which can be seen in FIGS. 12, 13 and additionally in FIGS. 3 to 5. The sealing rib 33 comprises a first endless rib portion 34, which fully encloses the inlet opening 18 of the outer tube 14, and a second endless rib portion 35, that extends from the inlet opening 18 of the outer tube 14 over the full angular range β on the inner surface of the outer tube 14, so that the entire potential range β of angular motion between the first angular stop 38 and the second angular stop 40 is enclosed by the second endless rib portion 35.

The rib portion 33, being formed from the relatively hard plastic material of the outer tube 14, in combination with the relatively soft sealing surface 32, provide a particularly good sealing effect, and at the same time the frictional force, that has to be overcome in order to operate the tap, is kept at a relatively low value due to the fact that the high surface pressure is restricted to a small surface by the thin sealing rib. The second rib portion 35 is necessary as the action of the first rib portion 34 ceases to exist as soon as a certain overlapping occurs between the inlet opening 18 of the outer tube 14 and the inlet opening 20 of the inner tube 16, the first rib portion 34 being then bridged at this point by the inlet opening 20 of the inner tube 16.

The operation during the tapping process, when the inner tube is rotated inside the outer tube, will now be described in more detail with reference to FIGS. 3 to 5.

Initially, the inner tube 16 is pulled from its closed position shown in FIG. 1 to the outside, the inner tube 16 being guided during this motion by the locking hook 25 engaging the axial portion 26 of the guide 24. The inner tube 16 is pulled out until the locking hook 25 abuts against the axial stop 30, which indicates to the user that the tapping process can now be initiated by turning the inner tube 16 to the left. This ready position, in which the inlet opening 18 of the outer tube 14 is completely sealed off by the sealing surface 32 and the additional sealing rib 33, is shown in FIG. 3.

Now, a suitable vessel is held under the outlet opening 22 of the inner tube 16, and the tapping process is initiated by turning the inner tube 16 to the left. Once the inner tube 16 has been turned to the left by an angular amount α, as shown in FIG. 4, the two inlet openings 18, 20 start to overlap each other so that fluid comes to leave the interior of the container. Since the rotary motion of the inner tube 16 inside the outer tube 14 can be sensitively controlled by the handle, it is possible, for example when broaching a beer keg, to let off any overpressure or froth before the tapping process is speeded up by turning the inner tube 16 further to the left. The gradual acceleration of the tapping process can be supported by giving either the inlet opening 18 of the outer tube 14 or the inlet opening 20 of the inner tube 16 a non-circular shape, for example the shape of a drop, keyhole, a triangular shape or any other shape extending in the circumferential direction, with gradually widening cross-section. If a type of beer is to be tapped, which normally produces relatively little froth, and if nevertheless the formation of more froth is desired, it is also possible to use a slotted shape with one slot extending in the circumferential direction or with one or more slots extending in the axial direction.

The inner tube 16 can be rotated to the left in FIG. 5 by a maximum angular amount β, i.e. until the locking hook 25 abuts against the second angular stop 40.

In the illustrated embodiment, the angle α, at which fluid starts to leave the inside of the container, is in the order of approximately 10°, while the angle β, at which the greatest opening angle is reached, is in the order of approximately 45°.

It is of course also imaginable to fix that angle β, where the greatest outlet cross-section for fluid leaving the container is available, at higher values of approximately 60° or, for example, 90°.

If the tapping process is to be terminated, the inner tube 16 is turned again to the right until the inlet openings 18 and 20 do no longer overlap.

Figure 14:
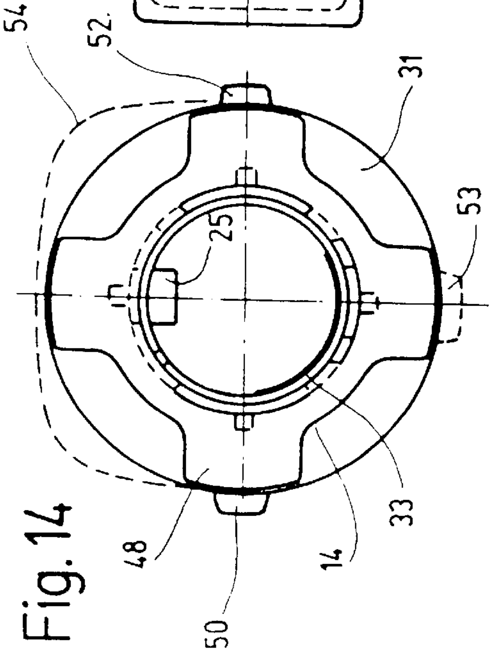
FIG. 14 shows a front view of the outer tube according to FIG. 12, viewed from the outside, where additional form-fit elements are shown for form-fitting accommodation in the opening of the container, which elements are not illustrated in the other Figures.

In the view of the outer tube 14 according to FIG. 14, additional form-fit elements can be seen that serve to mount the outer tube 14 with the plug sealing element 31 in a non-rotational way in the opening 12 of the container 10. This can be achieved, for example, by two oppositely arranged cams 50, 52, offset by 180°, that are formed on the outer tube and engage corresponding recesses in the wall 11 of the container 10 in order to thereby guarantee a non-rotational mounting by that form fit. Alternatively, it would also be possible to provide a single cam, as indicated in dashed lines at 53 in FIG. 14.

In addition, it would also be imaginable, for example, to give the entire plug element 31 a non-circular shape, i.e. an outer contour different from the circular shape as indicated by dashed lines at 54 in FIG. 14. This would of course permit to realize an anti-rotational mounting for the plug element in the opening 12 of the container 10.

Figure 15:
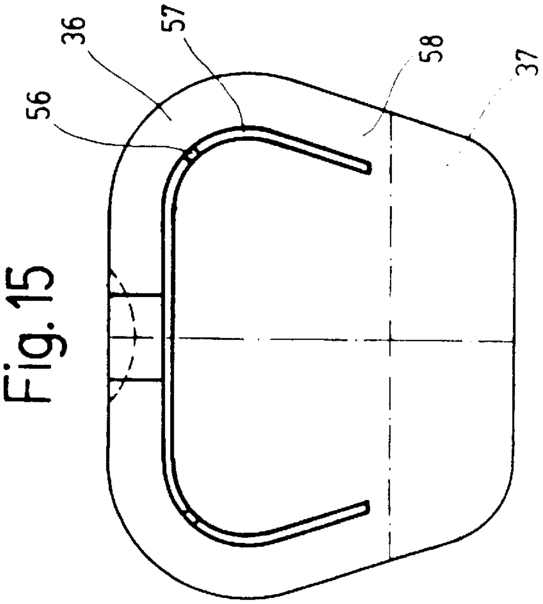
FIG. 15 shows a front view of the actuating plate of the inner tube, viewed from the outside.

FIG. 15 shows a front view of the actuating plate 37, viewed from the outside. As can be seen in the drawing, the handle 36, formed integrally with the actuating plate 37, is formed by a narrow space extending between the actuating plate and the full circumference of the handle 36, substantially in the form of that handle, which space 57 is bridged by two tear-off strips 56.

The two tear-off strips 56 serve as proof of the original condition, as they will tear off when the handle 36 is gripped for the first time and bent off. In addition, when the handle 36 is moved to a preferably vertical angular position, relative to the actuating plate 37, a certain discoloration of the plastic material will occur at the connection surfaces 58 between the ends of the space 37 and the handle 36, which likewise serves as an indication whether or not the handle 36 had been actuated before.

An additional feature securing the position can be realized either by a transverse rib at the bottom of the axial groove or by a narrower portion of the axial groove in order to secure the inner tube 16, in the completely assembled and filled condition of the container 10, during transportation and/or against the first pull-out action.

The soft sealing material used in the sealing components can be made from a thermoplastic elastomer, such as the material sold by PTS Marketing+Vertriebs GmbH, Germany under the name "PTS-Thermoflex". The hard plastic components, namely the outer tube, the inner tube and the remaining components formed integrally therewith, can be made from polypropylen (PP), such as the material sold unter the mark "Novolen" by BASF, Germany. According to the 2-component technology, the outer tube and the structural parts integral therewith, as well as the inner tube and the structural parts integral therewith, are preferably prepared by molding in a first molding step. Thereafter, the soft sealing components are attached to the hard components by a second molding step which leads to an intimate non-detachable contact between the soft and the hard components. It is selfevident that all these materials must be food-compatible to allow an application for containers which hold beverages such as beer.

What is claimed is:

1. A tap for withdrawing fluid from a container, said tap comprising:

- an outer tube adapted for inserting into an opening of said container and mounting in sealing engagement therewith;
- an inner tube which is received in sliding and sealing engagement within said outer tube;
- an inlet opening provided in said outer tube;
- an outlet opening provided in said inner tube;
- an inlet opening provided in said inner tube which communicates with said outlet opening of said inner tube;
- guide means provided on said outer and said inner tubes for guiding movement of said inner tube within said outer tube between a closed position, in which said inner tube is fully retracted within said outer tube and in which the inlet openings of said outer tube and said inner tubes do not overlap, an intermediate ready position in which said inlet openings of said outer tube and said inner tubes are not yet aligned with one another, and an open position in which said inlet openings of said outer and said inner tubes are at least partially aligned with one another;
- wherein said guide means comprises:
  - an axial portion extending axially on said inner tube;
  - a circumferential portion extending circumferentially on said inner tube; and
  - an engagement means guided within said axial portion and said circumferential portion and allowing axial movement of said inner tube within said outer tube between said closed and intermediate positions and allowing rotating movement of said inner tube within said outer tube between said intermediate and said open positions;
- wherein said inner tube further comprises a sealing surface which is embedded in a lateral surface of said inner tube, and which extends axially and circumferentially on the lateral surface of the inner tube to sealingly cover any possible range of movement of said inlet opening of said outer tube with respect to said inner tube in axial and rotational directions, as allowed by said guide means.

2. The tap as defined in claim 1, further comprising means for mounting said outer tube within the opening of the container and for locking said outer tube against rotation within said opening.

3. The tap as defined in claim 1, further comprising an axial intermediate stop engaging with said engagement means for indicating a user that the ready position has been reached, before the inner tube is rotated into the open position.

4. The tap as defined in claim 1, further comprising at least one angular stop for limiting any possible rotary motion of the inner tube within the outer tube.

5. The tap as defined in claim 2, wherein said mounting means comprises a plug sealing element provided on said outer tube configured for sealing engagement within said opening of said container, said plug sealing element comprising a soft outer shell molded onto a harder core.

6. The tap as defined in claim 1, wherein said sealing surface is made from a soft elastic material embedded within a harder plastic material of said inner tube.

7. The tap as defined in claim 6, further comprising a sealing rib protruding inwardly from an inner surface of said outer tube for sealingly engaging said sealing surface provided on said lateral surface.

8. The tap as defined in claim 7, wherein first and second angular stops are provided for limiting any possible rotary motion of the inlet opening of the inner tube within the outer tube to a certain angular range, and wherein said sealing rib comprises a first endless rib portion that surrounds the inlet opening of the outer tube, and a second endless rib portion that extends from the first rib portion surrounding the inlet opening of the outer tube to encircle the certain angular range of movement of the inlet opening with respect to the sealing surface provided on the inner tube.

9. The tap as defined in claim 8, wherein said outer tube and said sealing rib is made integrally from a hard plastic material similiar or equal to the plastic material of said inner tube.

10. The tap as defined in claim 1, wherein the inlet opening of the outer tube has a shape which is one of the group defined by a drop, a keyhole, a triangule, and a slot, all extending in circumferential direction, a slot extending in axial direction, and a circle.

11. The tap as defined in claim 1, wherein said engagement means of said guide means is configured as a locking hook arranged on and being integral with the outer tube, and wherein the axial portion of said guide means is configured as a guiding groove extending on the inner tube from a first outer end to a second inner end, and wherein the circumferential portion of said guide means is configured as a circumferential guiding groove extending from said inner end of said guiding groove in circumferential direction over a certain angular range.

12. The tap as defined in claim 11, wherein said second end of said axial portion forms a first angular stop and wherein the circumferential guiding groove forms at its end remote from the first angular stop a second angular stop, said first and second angular stops limiting any possible range of movement of said inner tube between said intermediate ready position and said open position.

13. The tap as defined in claim 12, wherein the inner end of said axial portion forms an intermediate stop for indicating a user that the intermediate ready position is reached when the inner tube is pulled out of said outer tube.

14. The tap as defined in claim 1, wherein said inner tube further comprises an outer end onto which an actuating plate having a fold-out handle is integrally molded, said fold-out handle being connected with the actuating plate by tear-off connecting strips.

15. The tap as defined in claim 1, wherein the guide means and the outlet opening are arranged such that the inner tube is to be rotated to the left for moving into the open position.

16. A tap for withdrawing fluid from a container, said tap comprising:

an outer tube adapted for inserting into an opening of said container and mounting in sealing engagement therewith;

an inner tube which is received in sliding and sealing engagement within said outer tube;

an inlet opening provided in said outer tube;

an outlet opening provided in said inner tube;

an inlet opening provided in said inner tube which communicates with said said outlet opening of said inner tube;

guide means provided on said outer and said inner tubes for guiding movement of said inner tube within said outer tube between a closed position, in which said inner tube is fully retracted within said outer tube and in which the inlet openings of said outer tube and said inner tubes do not overlap, an intermediate ready position in which said inlet openings of said outer tube and said inner tubes are not yet aligned with one another, and an open position in which said inlet openings of said outer and said inner tubes are at least partially aligned with one another;

a soft sealing surface which is embedded in a lateral surface of said inner tube made from a plastic material harder than said soft sealing surface; and a sealing rib protruding inwardly from an inner surface of said outer tube for sealingly engaging said soft sealing surface provided on said lateral surface, wherein said outer tube and said sealing rib are made integrally from a harder plastic material similar or equal to the plastic material of said inner tube.

17. A container for holding a fluid, said container comprising a tap for removing fluid therefrom, said tap comprising:

an outer tube adapted for inserting into an opening of said container and mounting in sealing engagement therewith;

an inner tube which is received in sliding and sealing engagement within said outer tube;

an inlet opening provided in said outer tube;

an outlet opening provided in said inner tube;

an inlet opening provided in said inner tube which communicates with said outlet opening of said inner tube;

guide means provided on said outer and said inner tubes for guiding movement of said inner tube within said outer tube between a closed position, in which said inner tube is fully retracted within said outer tube and in which the inlet openings of said outer tube and said inner tubes do not overlap, an intermediate ready position in which said inlet openings of said outer tube and said inner tubes are not yet aligned with one another, and an open position in which said inlet openings of said outer and said inner tubes are at least partially aligned with one another;

wherein said guide means comprises:

an axial portion extending axially on said inner tube;

a circumferential portion extending circumferentially on said inner tube; and an engagement means guided said axial portion and said circumferential portion and allowing axial movement of said inner tube within said outer tube between said closed and intermediate positions and allowing rotating movement of said inner tube within said outer tube between said intermediate and said open positions;

wherein said inner tube further comprises a sealing surface which is embedded in a lateral surface of said inner tube, and which extends axially and circumferentially on the lateral surface of the inner tube to sealingly cover any possible range of movement of said inlet opening of said outer tube with respect to said inner tube in axial and rotational directions, as allowed by said guide means.

18. The container as defined in claim 17, further comprising means for mounting said outer tube within the opening of the container and for locking said outer tube against rotation within said opening.

19. The container as defined in claim 17, further comprising an axial intermediate stop engaging with said engagement means for indicating a user that the ready position has been reached, before the inner tube is rotated into the open position.

20. The container as defined in claim 17, further comprising at least one angular stops for limiting any possible rotary motion of the inner tube within the outer tube.

21. The container as defined in claim 18, wherein said mounting means comprises a plug sealing element provided on said outer tube configured for sealing engagement within said opening of said container, said plug sealing element comprising a soft outer shell molded onto a harder core.

22. The container as defined in claim 17, wherein said sealing surface is made from a soft elastic material embedded within a harder plastic material of said inner tube.

23. The container as defined in claim 22, further comprising a sealing rib protruding inwardly from an inner surface of said outer tube for sealingly engaging said sealing surface provided on said lateral surface.

24. The container as defined in claim 23, wherein first and second angular stops are provided for limiting any possible rotary motion of the inlet opening of the inner tube within the outer tube to a certain angular range, and wherein said sealing rib comprises a first endless rib portion that surrounds the inlet opening of the outer tube, and a second endless rib portion that extends from the first rib portion surrounding the inlet opening of the outer tube to encircle the certain angular range of movement of the inlet opening with respect to the sealing surface provided on the inner tube.

25. The container as defined in claim 24, wherein said outer tube and said sealing rib is made integrally from a hard plastic material similiar or equal to the plastic material of said inner tube.

26. The container as defined in claim 17, wherein the inlet opening of the outer tube has a shape which is one of the group defined by a drop, a keyhole, a triangule, and a slot, all extending in circumferential direction, a slot extending in axial direction, and a circle.

27. The container as defined in claim 17, wherein said engagement means of said guide means is configured as a locking hook arranged on and being integral with the outer tube, and wherein the axial portion of said guide means is configured as a guiding groove extending on the inner tube from a first outer end to a second inner end, and wherein the circumferential portion of said guide means is configured as a circumferential guiding groove extending from said inner end of said guiding groove in circumferential direction over a certain angular range.

28. The container as defined in claim 27, wherein said second end of said axial portion forms a first angular stop and wherein the circumferential guiding groove forms at its end remote from the first angular stop a second angular stop, said first and second angular stops limiting any possible range of movement of said inner tube between said intermediate ready position and said open position.

29. The container as defined in claim 28, wherein the inner end of said axial portion forms an intermediate stop for indicating a user that the intermediate ready position is reached when the inner tube is pulled axially out of said outer tube.

30. The container as defined in claim 17, wherein said inner tube further comprises an outer end onto which an actuating plate having a fold-out handle is integrally molded, said fold-out handle being connected with the actuating plate by tear-off connecting strips.

31. The container as defined in claim 17, wherein the guide means and the outlet opening are arranged such that the inner tube is to be rotated to the left for moving into the open position.

* * * * *